Figure 1:
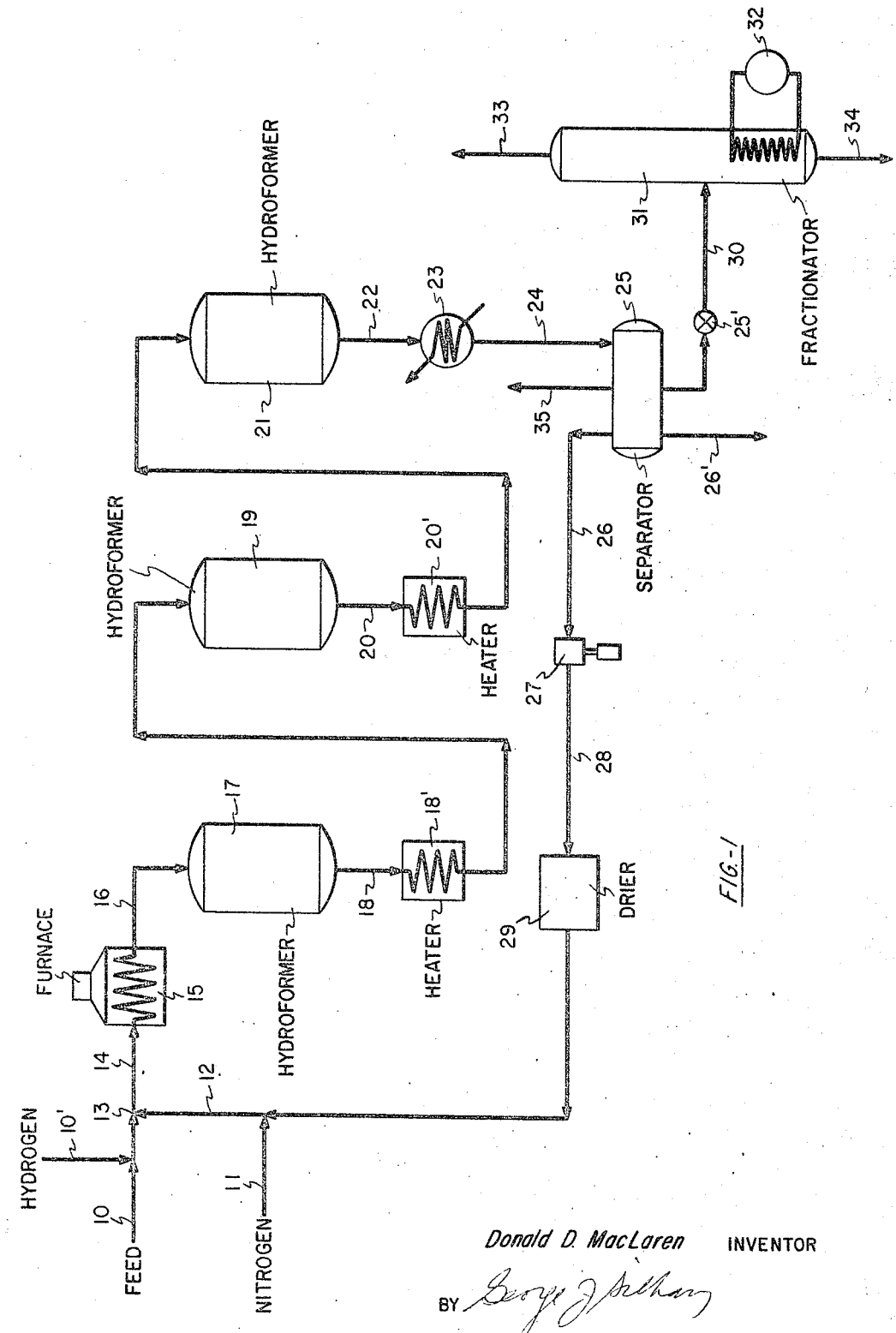

United States Patent Office 3,309,306
Patented Mar. 14, 1967

3,309,306
POWERFORMER STARTUP PROCEDURE USING NITROGEN-HYDROGEN MIXTURES
Donald D. MacLaren, Plainfield, N.J., assignor to Esso Research and Engineering Company, a corporation of Delaware
Filed Oct. 16, 1963, Ser. No. 316,748
10 Claims. (Cl. 208—138)

This invention pertains to the catalytic conversion of hydrocarbons and, more particularly, to the catalytic reforming or hydroforming of hydrocarbon fractions boiling within the motor fuel or naphtha range of low octane number into high octane number motor fuels rich in aromatics. More specifically, this invention describes a method of hydroforming in which the activity level of the catalyst is temporarily lowered without permanently poisoning the hydroforming catalyst.

Hydroforming is now a matter of record and commercial practice in this country. Basically, the operation involves the contacting of a naphtha, either virgin, cracked, Fischer-Tropsch or any mixture thereof, with a solid catalytic material. The contacting takes place at elevated temperatures and pressures in the presence of added hydrogen. However, the process itself produces substantial amounts of hydrogen and, in actuality, this will on occasion surpass the initial hydrogen which has been added to repress deactivation of the catalyst by carbon formation.

The reactions involved in hydroforming are: (1) dehydrogenation of naphthenes to the corresponding aromatic hydrocarbons as where methylcyclohexane is dehydrogenated to form toluene, (2) isomerization of paraffins to form branched chain paraffins or isomerization of ring compounds, such as ethylcyclopentane to form methylcyclohexane, which latter compound is then dehydrogenated to form toluene, (3) dehydrocyclization of paraffins to aromatics such as n-heptane to form toluene, and (4) hydrocracking of the higher boiling constituents of the feed to form lower boiling constituents.

Fixed bed platinum hydroforming processes may be divided into three general classes, namely, nonregenerative, semi-regenerative, and cyclic. The three processes differ most significantly in that the cyclic has an alternate or swing reactor which is so manifolded that it may replace any reactor within the system in order that it may be regenerated. The instant invention is particularly applicable to nonregenerative and semi-regenerative operation. The cyclic type may be used but it will not be as effective since the reactor is actually pressured with the recycle gas from the onstream reactors and there is no safe way in which to recirculate a nitrogen-hydrogen mixture, even if it were used.

Catalysts that may be used for hydroforming the feed are those containing 0.01 to 1.0 wt. percent platinum or 0.1 to 2.0 wt. percent palladium dispersed upon a highly pure alumina support such as is obtained from aluminum alcoholate, as per U.S. Patent No. 2,636,865 or from an alumina hydrosol prepared by hydrolyzing aluminum metal with dilute acetic acid in the presence of very small catalytic amounts of mercury. A suitable catalyst comprises about 0.2 to 0.8 wt. percent platinum widely dispersed upon alumina in the eta or gamma phase derived from a suitable aluminum alcoholate and between about 0.3 and 1.2 wt. percent $Cl_2$ and having a surface area of about 50 to 300 square meters per gram. However, a variety of other catalysts may be utilized such as platinum on desurfaced silica-alumina.

Conditions within the hydroformer may vary within relatively wide ranges. Pressure may vary between 100 and 900 p.s.i.g. Temperatures within the hydroformer may vary between about 800 to 1050° F. As a general rule, temperatures between 900 and 975° F. are most satisfactory. Traditionally, the cyclic process utilizes lower pressures and higher temperatures. Hydrogen is circulated through the hydroforming zone at a rate of 2000 to 10,000 cubic feet per barrel of liquid naphtha feed. The space velocity, or weight in pounds of feed charged per hour per pound of catalyst, depends upon the age or activity level of the catalyst, the character of the feed stock, and the desired octane number of the product. Ordinarily, it may vary from about 0.5 w./hr./w. to 15 w./hr./w., and is preferably 1 to 2.

A variety of problems have been overcome in the desire to obtain maximum efficiency from the hydroforming process. A recent patent, U.S. 2,935,464, concerned a remedy for excessive cracking or hydrocracking within the hydroforming process. The problem was solved by adding ammonia during the hydroforming process.

However, this did not provide a remedy for another very pertinent problem. When starting up hydroformers the catalyst has an extremely high initial level of reactivity. This results in an undesirably high coke make which rapidly reduces catalyst activity to a low level. One solution is to temporarily poison the catalyst during this period of otherwise excessive activity until the catalyst has equilibrated. However, if the poisoning of the catalyst is too complete, catalyst activity may be permanently impaired.

According to this invention a nitrogen-hydrogen mixture is circulated in the hydroformer unit before the feed is introduced. Upon circulating this mixture, a small amount of ammonia is synthesized over the hydroforming catalyst. An equilibrium of ammonia adsorbed on the catalyst and in the circulating gas stream is established. This temporarily poisons the catalyst thereby reducing its initial high activity and thus minimizing formation of coke during startup. The ammonia and nitrogen are then purged from the hydroformer unit and the catalyst regains its activity and levels off at a higher level than would be expected.

Extreme care must be taken in controlling the amount of ammonia during startup. Should the ammonia level in the hydrogen-nitrogen gas fall below about 50 p.p.m. by wt. before the feed is injected, catalyst activity will be too high and the hydroforming catalyst will be subjected to severe deactivation from high coke make. Over 200 p.p.m. of ammonia will permanently poison the catalyst. The ammonia level should be kept between about 50 and 100 p.p.m. in the recycle gas. The mixture of hydrogen and nitrogen should contain between 10 and 75% by weight of hydrogen and from 25 to 90% nitrogen by weight.

Figure 2:
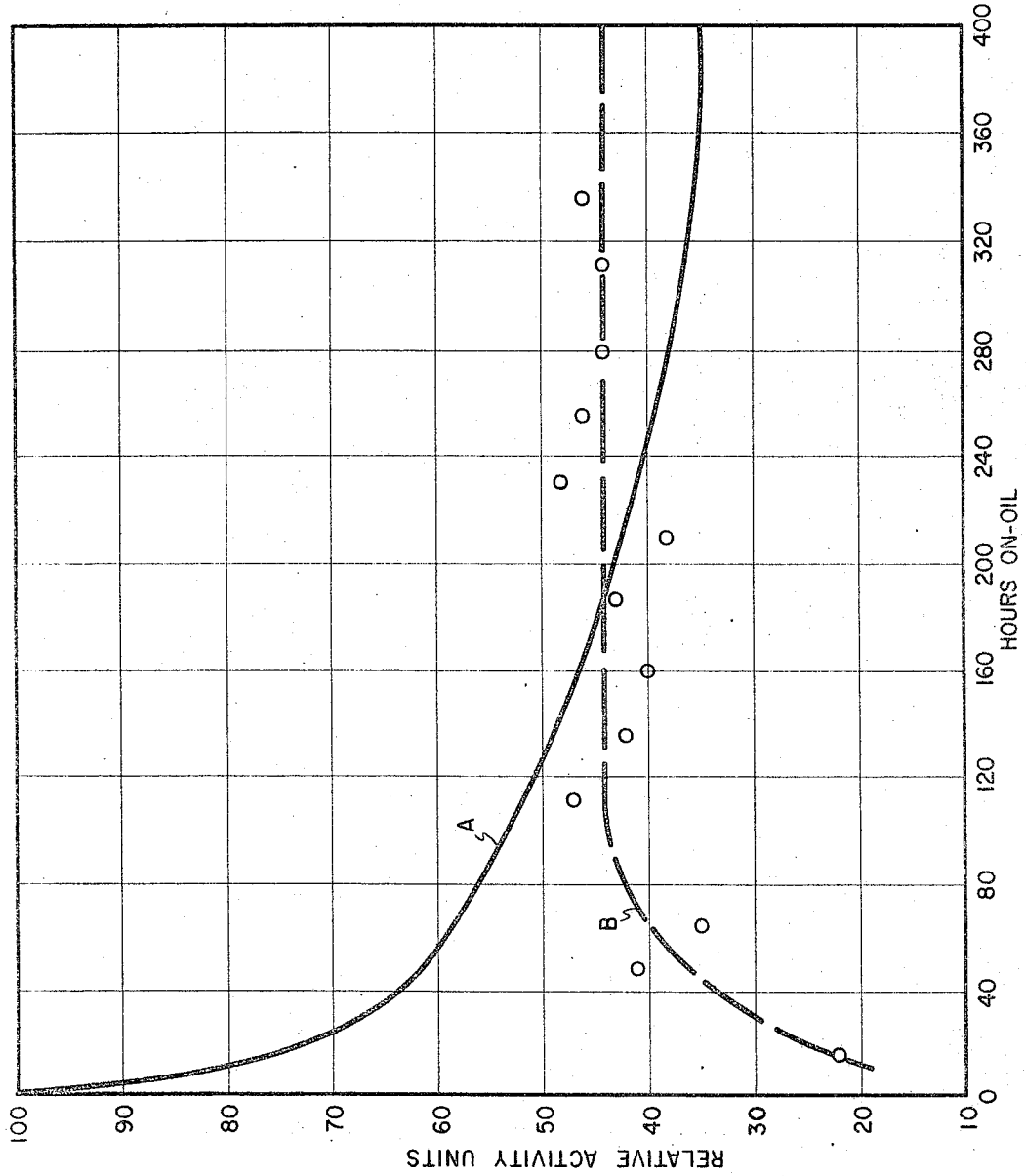

In the drawings:
FIGURE 1 is a diagrammatic representation of a preferred embodiment of this invention.
FIGURE 2 represents a plot of catalyst activities as a function of time in hydroforming processes where ammonia is formed in situ in one case versus the catalyst activity level in the other case where no ammonia was present. This figure will be explained more completely in the discussion of the examples.

Turning first to FIGURE 1. Hydrogen is introduced into the system through line 10' and is circulated throughout the system. The pressure level of the hydrogen is from 100 to roughly 250 p.s.i. After this, nitrogen is added to the unit. The nitrogen is added through line 11. The addition of nitrogen brings the total pressure within the unit to 200 to 400 p.s.i. The ratio of hydrogen to nitrogen within the mixture is roughly 50 to 50 but the exact range is not critical and hydrogen concentration may vary from 10 to 75% of the total mixture. At this point, after the hydrogen and nitrogen have been circulated, the unit is still cold. Preheat furnace 15, furnace 18', and furnace 20' are now fired. The temperature is gradually raised while continuously circulating the hydrogen and nitrogen. The nitrogen is transported through line 12 to point 13 where it joins the hydrogen stream to form the nitrogen-hydrogen mixture. The mixture passes through line 14 into preheater furnace 15. As mentioned previously, preheater furnace 15 has just been fired and is gradually being built up to a temperature of about 900° F. The mixture then passes through line 16 and enters the top of reactor 17. Within the hydroformer is a catalyst comprising 0.6 wt. percent platinum widely dispersed upon alumina containing about 0.7 wt. percent chlorine having a surface area of about 200 square meters per gram. Ammonia is formed within hydroformer 17 when the temperature reaches about 700° F. The ammonia formed and any remaining nitrogen and hydrogen mixture are passed into reactor 19 through line 18. Here more remaining nitrogen and hydrogen is converted to ammonia.

The ammonia formed passes through the entire system, that is to say all of the three hydroformers 17, 19 and 21, then through line 22, one or more heat exchangers 23, line 24 and separator 25. Valve 25' in line 30 leading from separator 25 is closed and the ammonia-containing gases pass through line 26, compressor 27, line 28 and then into a drier designated as 29. After passing through drier 29, the ammonia is recycled through line 12 back to point 13.

As the temperature within this system is being raised, as a result of the burners in the system, hydrogen in the gas will reduce the hydroforming catalyst producing water and will also desorb water adsorbed on the catalyst. This water must be removed from the system. This is accomplished by condensation in the heat exchanger 23 and the entrained water comes out mainly in the liquid form within separator drum 25 and is removed through line 26'. The recycle gas is saturated with water and the remainder of the water is removed in drier 29. In this manner the catalyst is not only reduced but also dried and at about the time when the water is removed from the system, the temperature of the unit has been brought up to about 900° F. Heating is at a rate of about 1° F. per minute.

During this drying period, especially after the temperature reaches 700° F., a small amount of ammonia is synthesized from the nitrogen-hydrogen mixture. The initial concentration of this material in the recycle gas is several hundred parts per million. The ammonia may be removed from the system by several mechanisms, that is to say that there are independent methods of obtaining the desired ammonia concentration of 50 to 100 p.p.m. Initially, the water which is desorbed from the catalyst and carried out in the recycle gas removes some of the ammonia as it condenses in heat exchanger 23. Thus, a large portion of the ammonia is removed with the liquid water separated in the separator drum. However, once this system has been sufficiently dried that water can no longer be condensed, it is then necessary to remove the ammonia by some other means. This can be done in two ways. First, by deliberately injecting water into the heat exchanger train prior to the separator drum 25 by means not shown, or the $NH_3$ may be removed by the desiccant in the driers. If the latter method is to be used, a desiccant such as activated alumina or acid resistant molecular sieves must be employed. Silica gel is not a satisfactory desiccant for this purpose, as the ammonia attacks the gel and reduces its adsorptive capacity.

Under these circumstances, the ammonia level in the system is gradually reduced. The level starts at several hundred p.p.m.'s and can be reduced down to the desired 50 to 100 p.p.m. level. The desired level is obtained by monitoring the ammonia concentration of the recycle gas. Monitoring can be carried on in a variety of ways. One method is to bubble a slip stream of the recycle gas to an adsorber which is calibrated to indicate the amount of ammonia in a recycle gas. An alternative method is to use an adsorptive system such as Draeger tubes which are adsorptive indicators which will tell the approximate concentration of ammonia in the gas. Draeger tubes are a colorimetric adsorbent indicator. When a known volume of gas is sucked through the tube, its color will change in proportion to the amount of the material being measured. The more ingredient, the wider the color band. The tube is calibrated to read p.p.m. directly. The ammonia concentration is monitored until it drops to between 50 and 100 p.p.m. This will usually coincide with the point at which the system is normally just about dry enough for introduction of the feed. When the ammonia concentration is between 50 and 100 p.p.m. and the water concentration sufficiently low, that is less than 100 p.p.m., the firing rate in the preheat furnace is reduced from 900° F. to produce a catalyst temperature of about 800° F. and the feed is then cut into the unit.

With the ammonia level at 50 to 100 p.p.m. and the catalyst temperature at about 800° F., feed is introduced through line 10. At this point the catalyst is already poisoned by the $NH_3$ circulating in the recycle gas. In the process of reducing the level to 50 to 100 p.p.m., some of the adsorbed $NH_3$ on the catalyst is stripped off giving the desired amount of poison to reduce the high initial activity. The feed may be a virgin, cracked or Fischer-Tropsch naphtha, or any mixture thereof. The feed is passed through line 10 into preheater 15 along with the recycle gas from line 12 where it is heated to a temperature of 850 to 1000° F. The heated feed is removed from preheater 15 through line 16 and passes into the top of hydroformer 17. Within hydroformer 17 there is some cooling due to the reaction. Consequently, after the mixture is removed from the hydroformer 17 through line 18, it is then reheated in furnace 18' to about 850 to 1000° F. The heated mixture continues through line 18 into hydroformer 19. The naphtha-ammonia and hydrogen mixture is removed through the bottom of hydroformer 19 and enters line 20. Along line 20 is furnace 20' where the mixture is reheated to 850 to 1000° F. After being reheated the mixture continues through line 20 and enters the top portion of hydroformer 21.

The hydroformed naphtha and ammonia mixture is removed from hydroformer 21 through line 22 and is passed to heat exchanger 23 where it is cooled to a temperature of about 70 to 125° F. After cooling, the hydroformed feed is removed from heat exchanger 23 through line 24 and passed to high pressure separator 25 to separate gases from liquid. Hydroformed naphtha is removed through the bottom of separator 25. In this case valve 25' is open. The hydroformed naphtha passes through line 30 into fractionator 31. Reboiler 32 provides the needed heat for fractionation. $C_4$— products are recovered from the top of fractionator 31 through line 33. $C_5+$ products or hydroformate is removed from the bottom of the fractionator through line 34. The gas produced in the reforming operation is purged from the system via line 35 thus maintaining constant pressure in the units.

Initially, the recycle gas is composed of hydrogen, nitrogen, light hydrocarbons and a small amount of $NH_3$. Small amounts of CO and $CO_2$ and $O_2$ are also present but in amounts of considerably less than 1%. This gas is removed overhead from separator 25 through line 26 and then passes into compressor 27. From compressor 27 the recycle gas passes through line 28 into one or more driers 29. Within the driers any moisture which has been formed is removed. Additionally, any $NH_3$ is removed so that the $NH_3$ level in the system is gradually reduced to zero as nitrogen is purged along with hydrogen from the system via line 35. This level may be obtained by monitoring procedures explained earlier in the specification. The recycle gas then returns to the reactors via line 12 back to point 13.

Example 1

A mixture of hydrogen and nitrogen was circulated through a hydroforming unit during startup and through silica gel recycle gas driers for a period of two days at a temperature of 700 to 800° F. in order to reduce scale and adsorbed oxides and dry the system down to about 100 p.p.m. of water. The gas mixture initially contained about 50% hydrogen by weight and about 50% nitrogen by weight. During this operation, considerable ammonia was made. However, most of this ammonia was removed from the system, both in water collected in the separator drum 25 in the early stages of drying and then subsequently by the silica gel desiccant in the drier 29 such that, when the naphtha feed was cut into the unit, the concentration of ammonia in the recycle gas was at a relatively low level. When the naphtha feed was cut into the unit, the concentration of ammonia was about 50 p.p.m. in the recycle gas. This was measured by means of Draeger tubes.

In Example 1 the feed was a virgin naphtha which was hydroformed in contact with a platinum on alumina catalyst at 920° F., 550 p.s.i.g., and 10,000 s.c.f. of $H_2$/barrel of naphtha feed. Under these conditions, the initial activity of the catalyst was about 20 relative activity units compared to an anticipated value of 100. However, over the next 3 to 4-day period, activity increased as ammonia was stripped from the system and activity leveled out at about 45 relative activity units. This compares to the expected activity level of about 35 relative activity units. This shows that the presence of a certain amount of ammonia is actually beneficial, since it reduces the high activity of the catalyst which normally results in excessive coke formation and a shortening of catalyst life. The gasoline yield was about 70% and had an octane of about 93 to 94 research clear.

Example 2

In another experiment a mixture of hydrogen and nitrogen was circulated through a hydroforming unit under conditions identical to Example 1 with respect to temperature, pressure, hydrogen recycle, and catalyst utilized. Example 2 differed from Example 1 with respect to the ammonia present. The hydrogen-nitrogen mixture which was identical to that of Example 1 was recycled through the system for a period of only eight hours before the feed was cut in, the feed being a virgin naphtha. At this point, there was over 200 p.p.m. by weight of ammonia in the recycle gas. Under these conditions, initial catalyst activity was very low. In fact, activity was so low that it was not possible to generate enough hydrogen to continue the reaction and the operation had to be terminated.

Example 3

In this example, conditions identical to Example 1 are utilized except there is no addition of nitrogen to the system. Only hydrogen was used as the reducing and heating gas and, consequently, no ammonia was formed. The initial activity of the catalyst was about 100 relative activity units. However, over the next 3 to 4-day period this decreases until a level of 35 relative activity units is reached.

From this reduced catalyst life it is apparent that the introduction of the nitrogen and hydrogen and consequent formation of ammonia, which is maintained at a level of 50 to 100 p.p.m., has a significant effect on the extension of catalyst life.

FIGURE 2 is a comparison of the relative activities of the catalyst in Example 1 and Example 3. Line A indicates the activity level in the catalyst activity in Example 3. Initially, the activity level is high but rapidly decreases. Line B represents the catalyst activity in Example 1, where the ammonia level was about 50 p.p.m. by weight in the recycle gas when feed was introduced. Initially, the activity level was lower but after about 160 hours the level surpassed the catalyst activity of Example 3 and continued to remain more active. Little or no deactivation occurred once the system equilibrated.

Many other modifications will be obvious to one killed in the art and are intended to be within the scope of this invention.

What is claimed is:

1. In the hydroforming of a naphtha feed fraction at conversion conditions of hydrogen recycle, temperature and pressure in a hydroforming zone, and in the presence of an active hydroforming catalyst selected from the group consisting of supported platinum and supported palladium, the improvement which comprises the increasing of catalyst efficiency by adding a mixture of gaseous nitrogen and hydrogen to the hydroforming zone before the addition of the naptha feed, heating and circulating the nitrogen and hydrogen through said hydroforming zone and over said hydroforming catalyst thereby forming ammonia and then adding naphtha feed to said ammonia-containing hydrogen for passage to the said hydroforming zone at a time when the ammonia present is equal to between 50 and 100 parts per million by weight based on the gas circulating through said hydroforming zone.

2. The process of claim 1 in which the catalyst is platinum on alumina.

3. The process of claim 1 in which the catalyst is palladium on alumina.

4. The process of claim 1 in which the hydrogen used is between 2000 and 12,000 cubic feet per barrel of naphtha feed, temperature is between 800 and 1050° F. and pressure is between 200 and 900 p.s.i.g.

5. In the hydroforming of a naphtha feed fraction in a hydroforming zone at conversion conditions of hydrogen recycle, temperature and pressure, and in the presence of an active hydroforming catalyst selected from the group consisting of supported platinum and supported palladium, the improvement which comprises the increasing of catalyst efficiency by adding nitrogen and hydrogen to the hydroforming zone before the addition of the naphtha feed, heating the said zone to a temperature of about 700° F. to a maximum temperature of about 900° F. after the addition of the nitrogen and hydrogen to the said hydroforming zone, circulating the nitrogen and hydrogen through said hydroforming zone and over said hydroforming catalyst to form ammonia, controlling the amount of ammonia so that the amount is between about 50 and 100 p.p.m. by weight based on the gas circulating through said hydroforming zone and then adding naphtha feed to said hydroforming zone.

6. In the hydroforming of a naphtha feed fraction at conversion conditions of hydrogen recycle, temperature and pressure in a hydroforming zone, and in the presence of a platinum on alumina catalyst, the improvement which comprises the increasing of catalyst efficiency by adding a mixture of gaseous nitrogen and hydrogen to the hydroforming zone before the addition of the naphtha feed, heating and circulating the nitrogen and hydrogen through said hydroforming zone and over said hydroforming catalyst thereby forming ammonia and then adding naphtha feed to said ammonia-containing hydrogen for passage to the said hydroforming zone at a time when the ammonia present is equal to between about 50 and 100 parts per million by weight based on the weight of said gaseous mixture circulating through said hydroforming zone.

7. The process of claim 6 wherein the said hydrogen-nitrogen gaseous mixture contains about 25 to 90% of nitrogen and substantially all of the remaining portion of the mixture is hydrogen.

8. The process of claim 6 wherein at least a portion of the ammonia formed must be removed from the system to establish an amount of ammonia present in the amount of about 50 to 100 parts per million by weight.

9. In the hydroforming of a naphtha feed fraction at conversion conditions of hydrogen recycle, temperature and pressure in a hydroforming zone, and in the presence of a palladium on alumina catalyst, the improvement which comprises the increasing of catalyst efficiency by adding a gaseous mixture of nitrogen and hydrogen to the hydroforming zone before the addition of the naphtha feed, heating and circulating nitrogen and hydrogen through said hydroforming zone and over said hydroforming catalyst thereby forming $NH_3$ and then adding naphtha feed to said ammonia-containing hydrogen for passage to the said hydroforming zone at a time when the ammonia present is equal to between about 50 and 100 parts per million by weight based on the gaseous mixture circulating through said hydroforming zone.

10. The process of claim 9 wherein the gaseous mixture of hydrogen and nitrogen contains between 10 and 75% by weight of hydrogen and between 25 and 90% by weight of nitrogen.

References Cited by the Examiner

UNITED STATES PATENTS

| 1,157,253 | 10/1915 | Pier | 23—198 |
|---|---|---|---|
| 2,773,014 | 12/1956 | Snuggs et al. | 208—65 |
| 2,880,161 | 3/1959 | Moore et al. | 208—65 |
| 2,906,699 | 9/1959 | Haensel et al. | 208—138 |
| 2,935,464 | 5/1960 | Dudley et al. | 208—138 |
| 2,980,605 | 4/1961 | Nifland et al. | 208—138 |
| 3,069,352 | 12/1962 | Mosesman | 208—140 |

FOREIGN PATENTS 577,008   5/1946   Great Britain.

DELBERT E. GANTZ, *Primary Examiner.*

HERBERT LEVINE, *Examiner.*